United States Patent
Fukuda et al.

(10) Patent No.: US 10,005,026 B2
(45) Date of Patent: Jun. 26, 2018

(54) LIMESTONE SUPPLY DEVICE AND AIR POLLUTION CONTROL SYSTEM

(71) Applicant: MITSUBISHI HITACHI POWER SYSTEMS, LTD., Yokohama-shi, Kanagawa (JP)

(72) Inventors: Toshihiro Fukuda, Tokyo (JP); Seiji Kagawa, Tokyo (JP); Naoyuki Kamiyama, Tokyo (JP); Susumu Okino, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 112 days.

(21) Appl. No.: 15/114,293

(22) PCT Filed: Dec. 10, 2014

(86) PCT No.: PCT/JP2014/082667
§ 371 (c)(1),
(2) Date: Jul. 26, 2016

(87) PCT Pub. No.: WO2015/114957
PCT Pub. Date: Aug. 6, 2015

(65) Prior Publication Data
US 2017/0007959 A1    Jan. 12, 2017

(30) Foreign Application Priority Data
Jan. 31, 2014    (JP) .................................. 2014-017996

(51) Int. Cl.
*B01D 53/34*    (2006.01)
*F23J 15/00*    (2006.01)
(Continued)

(52) U.S. Cl.
CPC ......... *B01D 53/346* (2013.01); *B01D 53/504* (2013.01); *B01D 53/508* (2013.01);
(Continued)

(58) Field of Classification Search
CPC .. F23J 15/003; F23J 15/04; F23J 15/06; F23J 2215/10; F23J 2215/20; F23J 2219/10;
(Continued)

(56) References Cited

U.S. PATENT DOCUMENTS 4,009,244 A * 2/1977 Atsukawa .............. B01D 53/60
423/212
4,355,013 A * 10/1982 Bechthold ............. B01D 53/34
423/243.01

(Continued)

FOREIGN PATENT DOCUMENTS

CN        1537668 A     10/2004
JP        61-35827 A    2/1986
(Continued)

OTHER PUBLICATIONS

Notification of Reasons for Refusal dated Jul. 4, 2017, issued in counterpart application No. 2014-017996, with English Translation. (8 pages).

(Continued)

*Primary Examiner* — Shogo Sasaki
(74) *Attorney, Agent, or Firm* — Westerman, Hattori, Daniels & Adrian, LLP

(57) ABSTRACT

A limestone supply device is provided for supplying calcium carbonate to an upstream of a desulfurization device and a heat exchanger disposed on an upstream of the desulfurization device on a flue gas duct through which flue gas discharged from a combustion engine in which a fuel burns flows. An air pollution control system having the limestone supply device is provided, including a calcium carbonate accumulate unit configured to accumulate calcium carbonate, a calcium carbonate transport unit configured to transport the calcium carbonate accumulated in the calcium carbonate accumulate unit, a calcium carbonate supply unit configured to supply the calcium carbonate transported by
(Continued)

the calcium carbonate transport unit to the flue gas duct, and a moisture supply unit configured to supply moisture to a region to which the calcium carbonate is supplied by the calcium carbonate supply unit.

7 Claims, 6 Drawing Sheets

(51) Int. Cl.
    *F23J 15/04*     (2006.01)
    *F23J 15/06*     (2006.01)
    *F23L 15/04*     (2006.01)
    *B01D 53/50*     (2006.01)
    *B01D 53/86*     (2006.01)

(52) U.S. Cl.
    CPC ........ *B01D 53/8625* (2013.01); *F23J 15/003* (2013.01); *F23J 15/04* (2013.01); *F23J 15/06* (2013.01); *F23L 15/04* (2013.01); *B01D 2251/404* (2013.01); *B01D 2251/606* (2013.01); *B01D 2258/01* (2013.01); *B01D 2258/0283* (2013.01); *F23J 2215/10* (2013.01); *F23J 2215/20* (2013.01); *F23J 2219/10* (2013.01); *F23J 2219/60* (2013.01); *Y02E 20/348* (2013.01)

(58) Field of Classification Search
    CPC ..... F23J 2219/60; F23L 15/04; B01D 53/346; B01D 53/504; B01D 53/508; B01D 53/8625; B01D 2251/404; B01D 2251/606; B01D 2258/01; B01D 2258/0283; Y02E 20/348
    See application file for complete search history.

(56) References Cited

U.S. PATENT DOCUMENTS

| | | | | |
|---|---|---|---|---|
| 4,372,926 A | * | 2/1983 | Gude | B01D 53/50 |
| | | | | 423/243.08 |
| 4,472,364 A | * | 9/1984 | Bauerle | B01D 53/501 |
| | | | | 423/166 |
| 4,620,856 A | * | 11/1986 | Rosenberg | B01D 53/501 |
| | | | | 423/243.09 |
| 5,814,288 A | * | 9/1998 | Madden | B01D 53/505 |
| | | | | 110/345 |
| 8,303,919 B2 | * | 11/2012 | Gadgil | B01D 53/8625 |
| | | | | 423/210 |
| 8,715,402 B2 | * | 5/2014 | Ukai | B01D 1/14 |
| | | | | 423/243.08 |
| 2008/0044332 A1 | * | 2/2008 | Rader | B01D 53/10 |
| | | | | 423/220 |
| 2013/0142715 A1 | * | 6/2013 | Nagayasu | B01D 53/75 |
| | | | | 423/220 |
| 2014/0050643 A1 | * | 2/2014 | Zhang | B01D 53/64 |
| | | | | 423/220 |
| 2015/0352490 A1 | * | 12/2015 | Fukuda | F26B 3/12 |
| | | | | 423/243.08 |

FOREIGN PATENT DOCUMENTS

| | | |
|---|---|---|
| JP | 5-57139 A | 3/1993 |
| JP | 5-301018 A | 11/1993 |
| JP | 8-953 A | 1/1996 |
| JP | 9-225259 A | 9/1997 |
| JP | 2000-317263 A | 11/2000 |
| JP | 2002-162020 A | 6/2002 |
| JP | 2007-245074 A | 9/2007 |
| JP | 2010-201428 A | 9/2010 |
| JP | 2013-34965 A | 2/2013 |
| JP | 2013-108680 A | 6/2013 |
| WO | 97/09110 A1 | 3/1997 |

OTHER PUBLICATIONS

Translation of Written Opinion dated Mar. 3, 2015, issued in counterpart International Application No. PCT/JP2014/082667 in Japanese (7 pages).

International Search Report dated Mar. 3, 2015, issued in counterpart International Application No. PCT/JP2014/082667 (2 pages).

Office Action dated May 4, 2017, issued in counterpart Chinese Application No. 201480074028.8, with English translation. (13 pages).

* cited by examiner

LIMESTONE SUPPLY DEVICE AND AIR POLLUTION CONTROL SYSTEM

FIELD

The present invention relates to a limestone supply device and an air pollution control system which treat flue gas discharged from a combustion engine.

BACKGROUND

There has been a known air pollution control system for treating flue gas discharged when fuel is burnt by a combustion engine such as a boiler installed in a thermal power generation facility, and the like. For example, as described in Patent Literature 1, the air pollution control system includes a denitration device that removes nitrogen oxides from flue gas from a boiler, an air heater that recovers heat of the flue gas passing through the denitration device, a heat recovery device that further recovers heat of the flue gas and uses the recovered heat to increase a temperature of the flue gas at a stack entrance, a dust collector that removes dust in the flue gas after the heat recovery, and a desulfurization device that removes sulfur oxides in the flue gas after the dust removing. A system in which the dust collector is installed in front of the heat recovery device may be used in some cases. A wet type desulfurization device that removes sulfur oxides in the flue gas by allowing a limestone absorbent, and the like to come into gas-liquid contact with the flue gas is generally used as the desulfurization device. The device described in Patent Literature 1 supplies charged solid particles to a flue gas duct on a downstream side of the dust collector.

CITATION LIST

Patent Literature

Patent Literature 1: Japanese Patent Application Laid-open No. 2007-245074

SUMMARY

Technical Problem

Herein, examples of the air pollution control system include an air pollution control system that supplies a portion of powdered limestone, which is used in a desulfurization device when sulfur oxides, mainly $SO_3$, contained in flue gas is removed, on an upstream side of an air heater or an upstream side of a heat recovery device. When the limestone is supplied on the upstream side of the air heater or the upstream side of the heat recovery device, $SO_3$, which is condensed when the flue gas is cooled by the air heater, may be removed by a physical absorption reaction, a chemical alkali reaction, or the like by the powdered limestone, and may be inhibited from adhering to an inside of the device. The limestone put into flue gas may be collected by a dust collector or the desulfurization device in a slipstream. However, as the amount of $SO_3$ which needs to be removed increases, the amount of the limestone supplied to the upstream side of the air heater or the upstream side of the heat recovery device increases. For this reason, a capacity of the dust collector or the desulfurization device in the slipstream increases.

In view of the above-mentioned problem, an object of the invention is to provide a limestone supply device and an air pollution control system capable of efficiently removing sulfur oxides, mainly $SO_3$, contained in flue gas.

Solution to Problem

According to the present invention, there is provided an air pollution control system comprising: a heat exchanger configured to recover heat of flue gas from a combustion engine in which fuel burns; a dust collector configured to remove dust in the flue gas before the heat is recovered by the heat exchanger; a desulfurization device configured to remove sulfur oxides contained in the flue gas using an absorbent after removing the dust; a limestone supply device arranged between the dust collector and the desulfurization device or an upstream of the dust collector; and a controller, wherein the limestone supply device comprising; a calcium carbonate accumulate unit configured to accumulate calcium carbonate; a calcium carbonate transport unit configured to transport the calcium carbonate accumulated in the calcium carbonate accumulate unit; a calcium carbonate supply unit configured to supply the calcium carbonate transported by the calcium carbonate transport unit to a flue gas duct; and a moisture supply unit configured to supply moisture to a region of the flue gas duct to which the calcium carbonate is supplied by the calcium carbonate supply unit; wherein the controller is configured to adjust an amount of the calcium carbonate supplied from the calcium carbonate supply unit and an amount of the calcium carbonate in the absorbent supplied to the desulfurization device based on a sulfur oxide concentration in the flue gas.

Preferably, the moisture supply unit is disposed around an end portion of the calcium carbonate supplying unit at which the calcium carbonate is supplied to form double pipes with the end portion of the calcium carbonate supply unit, and the moisture supply unit supplies the moisture from an outer circumference of the end portion.

Preferably, the moisture supply unit supplies the moisture to the flue gas duct on an upstream side of a position at which the calcium carbonate supply unit supplies the calcium carbonate in a flow direction of the flue gas.

Preferably, moisture is superheated vapor.

According to the present invention, there is provided an air pollution control system comprising: a heat exchanger configured to recover heat, of the flue gas from the combustion engine in which the fuel burns; a dust collector configured to remove dust in the flue gas before the heat is recovered by the heat exchanger; a desulfurization device configured to remove sulfur oxides contained in the flue gas using an absorbent after removing the dust; and the limestone supply device described above disposed between the dust collector and the heat exchanger.

Preferably, the combustion engine is a boiler.

Advantageous Effects of Invention

According to the invention, a state in which $SO_3$ adheres more easily to limestone sprayed in a flue gas duct can be achieved by supplying moisture to the flue gas duct. In this way, sulfur oxides in flue gas may be more reliably treated by a desulfurization device. In addition, $SO_3$ may be more reliably inhibited from adhering to an inside of the flue gas duct.

DESCRIPTION OF EMBODIMENTS

Hereinafter, a preferred embodiment of the invention will be described in detail with reference to accompanying drawings. It should be noted that the invention is not restricted by the embodiment. Further, when a plurality of embodiments is present, a combination of the respective embodiments is included.

Figure 1:
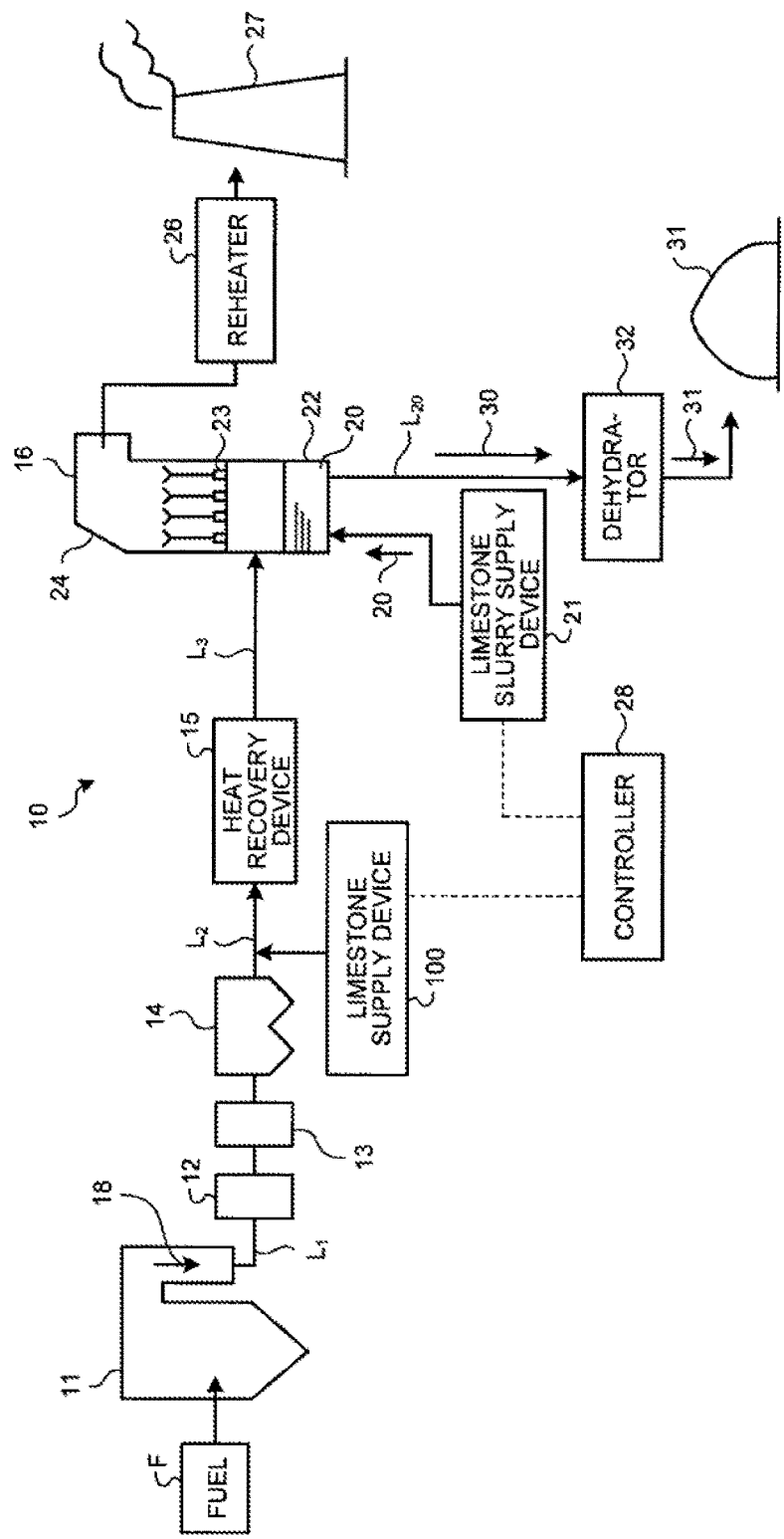
FIG. 1 is a schematic block diagram of an air pollution control system according to the present embodiment.

FIG. 1 is a schematic block diagram of an air pollution control system according to the present embodiment. For example, an air pollution control system illustrated in FIG. 1 is an apparatus that removes harmful substances such as nitrogen oxides ($NO_x$), sulfur oxides ($SO_x$), or the like from boiler flue gas (hereinafter referred to as "flue gas") 18 from a boiler 11 such as a coal-fired boiler which uses coal, a residual solid material, and the like as a fuel, an oil-fired boiler which uses heavy oil, residual oil, and the like as a fuel, and the like. In the present embodiment, a boiler is used as a combustion mechanism that burns a fuel. However, the invention is not limited thereto. Various combustion engines that burns a fuel and discharges flue gas may be used in place of the boiler 11.

The air pollution control system 10 according to the present embodiment includes the boiler 11 that burns a fuel F, a denitration device 12 that removes and reduces nitrogen oxides in flue gas 18 from the boiler 11, an air heater 13 that recovers heat of the flue gas 18 after denitration to lower a temperature of the flue gas 18, a dust collector 14 that removes dust in the flue gas 18 as collected dust and ash after the heat recovery, a heat recovery device 15 that lowers a temperature of the flue gas 18 passing through the dust collector 14, a desulfurization device 16 that removes and reduces sulfur oxides contained in the flue gas 18 after the heat recovery using limestone slurry 20 as an absorbent, a reheater 26 that reheats the flue gas desulfurized by the desulfurization device 16, a stack 27 that discharges the flue gas heated by the reheater 26, a controller 28 that controls operation of each unit, a dehydrator 32 that recovers gypsum 31 from an absorbent 30 which is desulfurization discharged water discharged from the desulfurization device 16, and a limestone supply device 100 that supplies limestone to a flue gas duct on an upstream side of the heat recovery device 15. In addition, in the air pollution control system 10, the boiler 11, the denitration device 12, the air heater 13, and the dust collector 14 are connected by a gas supply line $L_1$, the dust collector 14 and the heat recovery device 15 are connected by a gas supply line $L_2$, and the heat recovery device 15 and the desulfurization device 16 are connected by a gas supply line $L_3$. A flow path through which the flue gas flows such as the gas supply lines $L_1$, $L_2$, and $L_3$, and the like serves as a flue gas duct. The flue gas is discharged from the boiler 11, and passes through the gas supply lines $L_1$, $L_2$, and $L_3$ in order. The flue gas passing through the desulfurization device 16 passes through the reheater 26, and then is discharged to the stack 27. The limestone supply device 100 is connected to the gas supply line $L_2$ to supply the limestone to the gas supply line $L_2$.

The denitration device 12 is connected to the boiler 11 through the gas supply line $L_1$, and the flue gas discharged from the boiler 11 is supplied thereto through the gas supply line $L_1$. The denitration device 12 is a device that removes nitrogen oxides contained in the flue gas 18, and has a denitration catalyst layer therein. A reducing agent injector is disposed on an upstream side of the denitration catalyst layer, and a reducing agent is injected into the flue gas 18 from the reducing agent injector. Herein, for example, ammonia, urea, ammonium chloride, and the like are used as the reducing agent. When nitrogen oxides in the flue gas 18 introduced to the denitration device 12 come into contact with the denitration catalyst layer, the nitrogen oxides in the flue gas 18 are decomposed into nitrogen gas ($N_2$) and water ($H_2O$) and removed. In this way, the flue gas 18 passing through the denitration device 12 is in a state in which nitrogen oxides are reduced and removed.

The air pollution control system 10 may not include the denitration device 12. The denitration device 12 may be omitted from the air pollution control system 10 when a nitrogen oxide concentration is extremely low in the flue gas 18 from the boiler 11, or when these substances are not contained in the flue gas 18.

The air heater 13 is connected to the denitration device 12 through the gas supply line $L_1$, and the flue gas 18 passing through the denitration device 12 is supplied thereto through the gas supply line $L_1$. The air heater 13 is a heat exchanger that recovers heat in the flue gas 18. After the nitrogen oxides are removed by the denitration device 12, the air heater 13 recovers heat in the flue gas 18 supplied through the gas supply line $L_1$ to lower a temperature of the flue gas 18. For example, the temperature of the flue gas 18 passing through the denitration device 12 is high at about 300° C. to 400° C., and thus the heat is exchanged between the flue gas 18 at a high temperature and combustion air at a room temperature by the air heater 13. The combustion air increased in temperature by the heat exchange is supplied to the boiler 11. Meanwhile, for example, the flue gas 18 exchanging heat with the combustion air at the room temperature is cooled up to about 150° C.

The dust collector 14 is connected to the air heater 13 through the gas supply line $L_1$, and the flue gas 18 passing through the air heater 13 is supplied thereto through the gas supply line $L_1$. After the heat is recovered by the air heater 13, the dust collector 14 removes dust in the flue gas 18 supplied through the gas supply line $L_1$. Examples of the dust collector 14 include an inertial dust collector, a centrifugal dust collector, a filtration type dust collector, an electric dust collector, a cleaning dust collector, and the like. However, the dust collector 14 is not particularly restricted thereto.

The heat recovery device 15 is connected to the dust collector 14 through the gas supply line $L_2$, and the flue gas 18 passing through the dust collector 14 is supplied thereto through the gas supply line $L_2$. The heat recovery device 15 is a heat exchanger that recovers heat in the flue gas 18. After the dust is removed by the dust collector 14, the heat recovery device 15 recovers heat in the flue gas 18 supplied through the gas supply line $L_2$ to lower a temperature of the flue gas 18. For example, the heat recovery device 15 cools the flue gas 18 up to about 85 to 110° C.

In addition, the limestone supply device 100 is connected to the gas supply line $L_2$. The limestone supply device 100 supplies the powdered limestone to the gas supply line $L_2$. In this way, the limestone is mixed with the flue gas supplied to the heat recovery device 15. The limestone supply device 100 will be described later.

The desulfurization device 16 is connected to the heat recovery device 15 through the gas supply line $L_3$, and the flue gas passing through the heat recovery device 15 is supplied thereto through the gas supply line $L_3$. The desulfurization device 16 is a device that removes sulfur oxides in the flue gas 18 supplied through the gas supply line $L_3$ using a wet process. In the desulfurization device 16, for example, the limestone slurry (an aqueous solution in which the powdered limestone is dissolved in water) 20 is used as an alkali absorbent, and a temperature inside the device is adjusted to, for example, about 30 to 80° C. The limestone slurry 20 is supplied to a liquid receiver inside a column bottom portion 22 of the desulfurization device 16 from a limestone slurry supply device 21. In addition, in the desulfurization device 16, the limestone supplied from the limestone supply device 100 is supplied together with the flue gas to dissolve in the limestone slurry 20, thereby becoming a portion of the alkali absorbent. The limestone slurry 20 supplied to the column bottom portion 22 of the desulfurization device 16 is sent to a plurality of nozzles 23 inside the desulfurization device 16 through an absorbent feeding line (not illustrated), and spouts toward a column top portion 24 side from the nozzles 23. When the flue gas 18 rising from the column bottom portion 22 side of the desulfurization device 16 comes into gas-liquid contact with the limestone slurry 20 spouting from the nozzles 23, sulfur oxides and mercury chloride in the flue gas 18 are absorbed by the limestone slurry 20, and separated and removed from the flue gas 18. The flue gas 18 purified by the limestone slurry 20 is discharged as purified gas from the column top portion 24 side of the desulfurization device 16.

Inside the desulfurization device 16, sulfur oxides $SO_x$ in the flue gas 18 react with the limestone slurry 20 as shown in the following reaction formula (1).

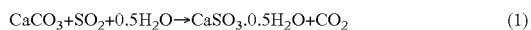

$$CaCO_3 + SO_2 + 0.5H_2O \rightarrow CaSO_3 \cdot 0.5H_2O + CO_2 \quad (1)$$

Further, the limestone slurry 20 absorbing $SO_x$ in the flue gas 18 is subjected to an oxidation treatment by air (not illustrated) supplied to the column bottom portion 22 of the desulfurization device 16, and reacts with the air as shown in the following reaction formula (2).

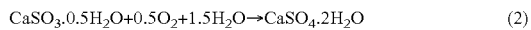

$$CaSO_3 \cdot 0.5H_2O + 0.5O_2 + 1.5H_2O \rightarrow CaSO_4 \cdot 2H_2O \quad (2)$$

In this way, $SO_x$ in the flue gas 18 is captured in a form of gypsum $CaSO_4 \cdot 2H_2O$ in the desulfurization device 16.

In addition, as described above, slurry obtained by pumping a liquid accumulated in the column bottom portion 22 of the desulfurization device 16 is used as the limestone slurry 20. However, gypsum $CaSO_4 \cdot 2H_2O$ is mixed with the pumped limestone slurry 20 by the reaction formulae (1) and (2) due to operation of the desulfurization device 16. Hereinafter, this pumped limestone gypsum slurry (limestone slurry mixed with gypsum) is referred to as an absorbent.

The absorbent (limestone gypsum slurry) 30 used for desulfurization is discharged to the outside from the column bottom portion 22 of the desulfurization device 16, is sent to the dehydrator 32 through an absorbent line $L_{20}$, and is subjected to dehydration therein. This dehydrated filtrate becomes desulfurization discharged water. However, heavy metal such as mercury and halogen ions such as $Cl^-$, $Br^-$, $I^-$, $F^-$, or the like are contained therein.

The dehydrator 32 separates a solid part containing the gypsum 31 in the absorbent 30 from the dehydrated filtrate corresponding to a liquid part. For example, a belt filter, a centrifugal separator, a decanter type centrifugal settler, or the like is used as the dehydrator 32. The gypsum 31 is separated from the absorbent 30, which is discharged from the desulfurization device 16, by the dehydrator 32.

The reheater 26 is disposed on a downstream side of the desulfurization device 16 in a flow direction of the flue gas 18. The reheater 26 is a heat exchanger that heats the flue gas 18. The reheater 26 heats the flue gas 18, which is supplied after the sulfur oxides are removed therefrom by the desulfurization device 16, to increase a temperature of the flue gas 18. For example, the reheater 26 heats the flue gas 18 to 90 degrees or more. The stack 27 is disposed on a downstream side of the reheater 26 in the flow direction of the flue gas 18. The stack 27 discharges the flue gas 18 heated by the reheater 26 to the outside the system. The air pollution control system 10 may inhibit the flue gas discharged from the stack 27 from becoming white smoke, and the like by heating the flue gas using the reheater 26, and then discharging the heated flue gas from the stack 27.

Figure 2:
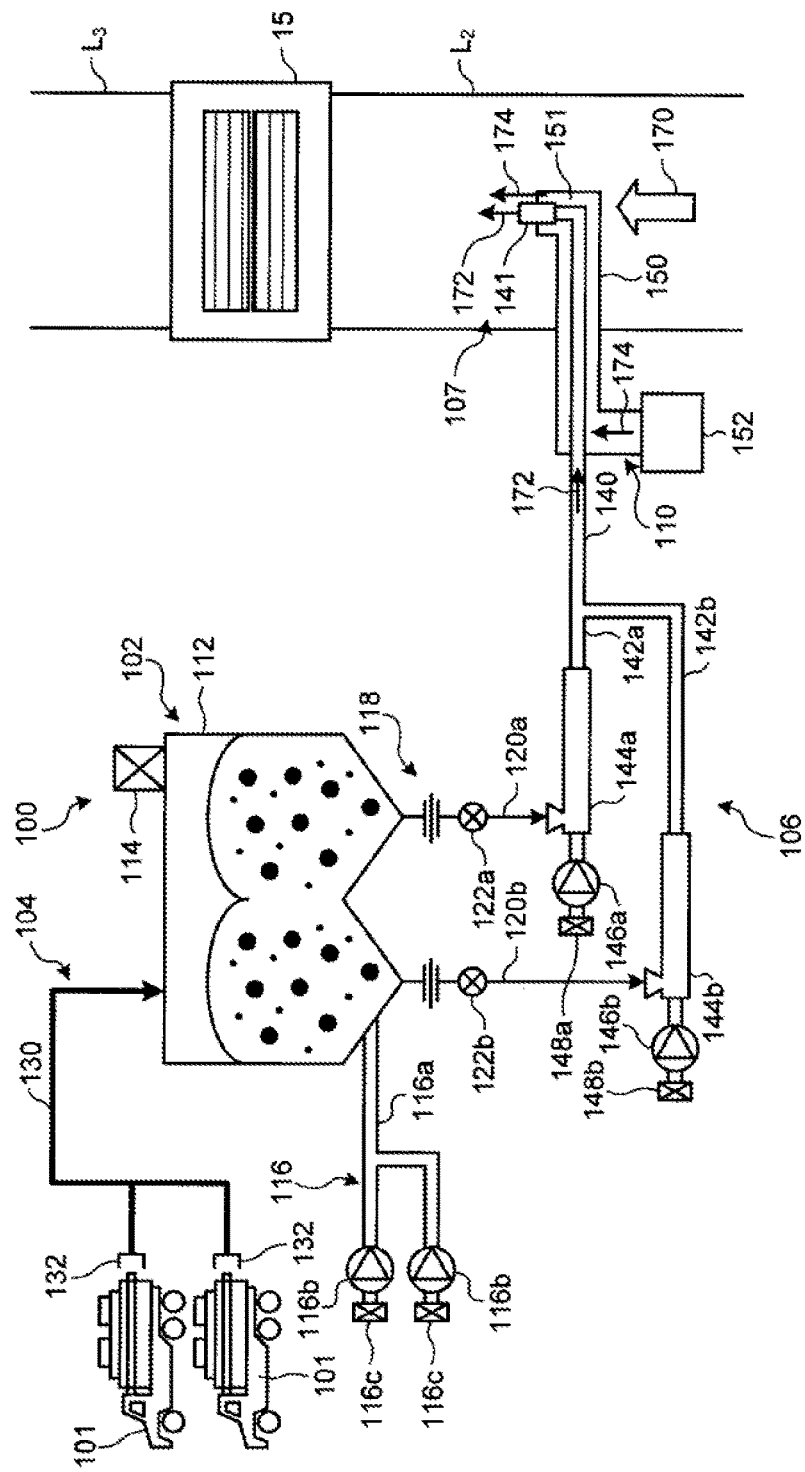
FIG. 2 is a schematic diagram illustrating an example of a limestone supply device of the air pollution control system.
Figure 3A:
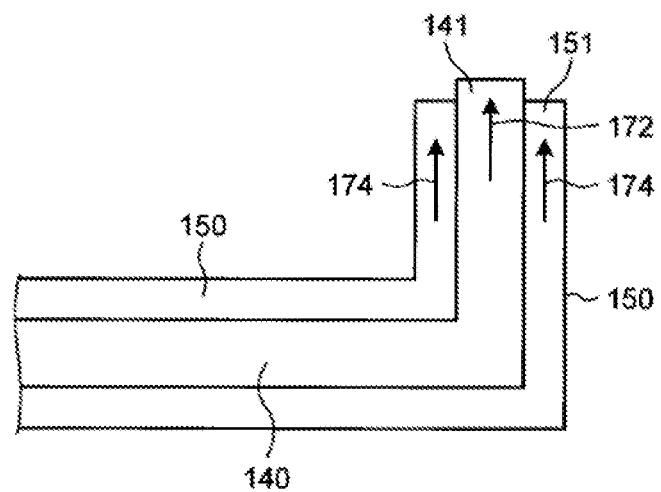
FIG. 3A is a schematic diagram enlarging and illustrating a portion around a nozzle for supplying limestone of the limestone supply device.
Figure 3B:
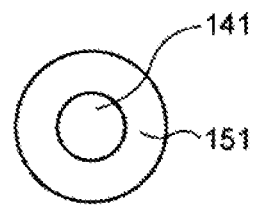
FIG. 3B is a front view enlarging and illustrating the portion around the nozzle for supplying limestone of the limestone supply device.
Figure 4:
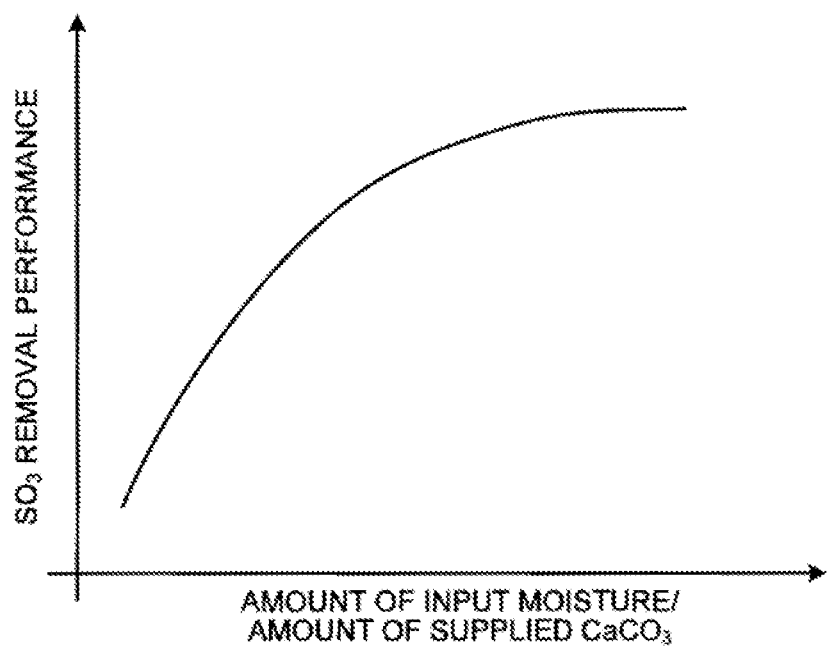
FIG. 4 is a graph illustrating an example of a relation between vapor and treating capability.

Next, the limestone supply device 100 will be described using FIG. 2 to FIG. 4. FIG. 2 is a schematic diagram illustrating an example of the limestone supply device of the air pollution control system. FIG. 3A is a schematic diagram enlarging and illustrating a portion around a nozzle for supplying the limestone of the limestone supply device. FIG. 3B is a front view enlarging and illustrating the portion around the nozzle for supplying the limestone of the limestone supply device. FIG. 4 is a graph illustrating an example of a relation between vapor and treating capability.

As described in the foregoing, the limestone supply device 100 is connected to the gas supply line $L_2$ to supply the powdered limestone to the gas supply line $L_2$. As illustrated in FIG. 2, the limestone supply device 100 includes a limestone accumulate unit 102, a limestone input means 104, a limestone transport unit 106, a limestone supply unit 107, and a moisture supply unit 110.

The limestone accumulate unit 102 includes a silo 112, a bag filter 114, an aeration mechanism 116, and a limestone feeder 118. The silo 112 is a tower that accumulates the limestone (calcium carbonate). The bag filter 114 is installed in a portion, specifically, an upper portion in a vertical direction of the silo 112. The bag filter 114 is a filter that allows air to pass therethrough and blocks the limestone. The bag filter 114 allows air to pass while not allowing the limestone to pass between an inside and an outside of the silo 112.

The aeration mechanism 116 includes an air supply line 116a, two blowers 116b, and two filters 116c. One end portion of the air supply line 116a is connected to the silo 112. The other end portion of the air supply line 116a branches into two lines, and the respective lines are connected to the blowers 116b. In addition, the filters 116c are disposed at the other end portions of the air supply line 116a. The filters 116c prevent solid content from flowing in from the other end portions of the air supply line 116a. Air is inhibited from flowing in an outward direction from the air supply line 116a. The two respective blowers 116b are connected to the air supply line 116a. The blowers 116b supply air to the air supply line 116a, and allow air into the silo 112 from the air supply line 116a. The aeration mechanism 116 supplies air to the silo 112 from the air supply line 116a using the blowers 116b, thereby supplying air to a region of the silo 112 in which the limestone is accumulated to fluidize the limestone. In addition, when the air supply line 116a branches into the two lines and the blowers 116b are provided to the respective lines, the aeration mechanism 116 may continuously supply air into the silo 112.

The limestone feeder 118 includes feeder lines 120a and 120b and valves 122a and 122b. One end portions of the feeder lines 120a and 120b are connected to a bottom portion of the silo 112, and the other end portions of the feeder lines 120a and 120b are connected to the limestone transport unit 106. The feeder lines 120a and 120b are connected to different positions of the bottom portion of the silo 112. The valve 122a is installed in the feeder line 120a. The valve 122b is installed in the feeder line 120b. The limestone feeder 118 controls opening and closing of the valves 122a and 122b to supply the limestone to the limestone transport unit means 106 from the silo 112 by opening the valves 122a and 122b and to stop supply of the limestone from the silo 112 to the limestone transport unit 106 by closing the valves 122a and 122b.

Next, the limestone input means 104 includes an input line 130 and an input port 132 connected to an end portion of the input line 130. One end portion of the input line 130 is connected to the silo 112, and the other end portion of the input line 130 is connected to the input port 132. The input port 132 is connected to a transport vehicle 101 loaded with the limestone. In the limestone input means 104, the limestone loaded in the transport vehicle 101 flows into the input line 130 from the input port 132, and is input into the silo 112.

Next, the limestone transport unit 106 includes a limestone supply line 140, branch lines 142a and 142b, mixing units 144a and 144b, blowers 146a and 146b, and filters 148a and 148b. The limestone supply line 140 supplies the limestone, which is supplied from the limestone accumulate unit 102, to the limestone supply unit 107. One end portion of the limestone supply line 140 is connected to the branch lines 142a and 142b, and the other end portion of the limestone supply line 140 is connected to the limestone supply unit 107. Since the other end portion of the limestone supply line 140 is connected to the limestone supply unit 107 which is disposed inside the gas supply line $L_2$ corresponding to a flue gas duct, the other end portion side is inserted into the gas supply line $L_2$. The branch line 142a is connected to the feeder line 120a, and the mixing unit 144a, the blower 146a, and the filter 148a are disposed inside a path. One end portion of the branch line 142a is connected to the limestone supply line 140, and the filter 148a is disposed at the other end portion of the branch line 142a. The blower 146a, the mixing unit 144a, and a portion connected to the feeder line 120a are disposed in this order on the branch line 142a from the filter 148a toward the limestone supply line 140.

The mixing unit 144a mixes the supplied limestone and air, and pneumatically conveys the limestone. The limestone and air mixed by the mixing unit 144a are supplied to the limestone supply line 140. The blower 146a is an air blower that sends air, and sends air from the filter 148a toward the limestone supply line 140. The filter 148a prevents solid content from flowing in from the other end portion of the branch line 142a.

The branch line 142b is connected to the feeder line 120b, and the mixing unit 144b, the blower 146b, and the filter 148b are disposed inside a path. Arrangements and configurations of the respective portions are similar to the respective portions of the branch line 142a, and thus a description thereof will be omitted.

The limestone transport unit 106 mixes the limestone supplied from the feeder lines 120a and 120b and air supplied from the blowers 146a and 146b using the mixing units 144a and 144b, and supplies the limestone and the air from the branch lines 142a and 142b to the limestone supply line 140 while pneumatically conveying the limestone. The limestone 172 supplied to the limestone supply line 140 is supplied to the limestone supply unit 107.

Next, the limestone supply unit 107 includes a nozzle 141. The nozzle 141 is disposed inside the gas supply line $L_2$, and is connected to the end portion of the limestone supply line 140. The nozzle 141 sprays the limestone supplied from the limestone supply line 140 into the gas supply line $L_2$. The limestone supply unit 107 sprays the limestone 172 into the gas supply line $L_2$ using a force of transporting the limestone by the limestone transport unit 106, that is, a force of air sent by the blowers 146a and 146b.

Next, the moisture supply unit 110 includes a vapor supply line 150, a vapor nozzle 151, and a vapor supply unit 152. The vapor supply line 150 is a pipe that guides vapor 174, and is a pipe that covers an outer circumference of the limestone supply line 140. The vapor supply line 150 extends from an outside to an inside of the gas supply line $L_2$. As illustrated in FIG. 3A and FIG. 3B, the vapor supply line 150 and the limestone supply line 140 have a double pipe structure in which the limestone supply line 140 corresponds to an inner pipe line and the vapor supply line 150 corresponds to an outer pipe line. The vapor nozzle 151 is disposed at an end portion of the vapor supply line 150 inside the gas supply line $L_2$. The vapor supply unit 152 is connected to an end portion of the vapor supply line 150 outside the gas supply line $L_2$. Various vapor supply sources may be used as the vapor supply unit 152. For example, the vapor supply unit 152 may use a mechanism in which the vapor is supplied from a vapor header that accumulates vapor overheated and generated by the boiler 11.

The moisture supply unit 110 supplies vapor from the vapor supply unit 152 to the vapor supply line 150, and sprays the vapor 174 from the vapor nozzle 151 into the gas supply line $L_2$. Herein, in the moisture supply unit 110, as illustrated in FIG. 3A and FIG. 3B, the vapor nozzle 151 is disposed on an outer circumference of the nozzle 141. In this way, the vapor nozzle 151 sprays the vapor 174 in a range that includes a range in which the limestone 172 sprayed from the nozzle 141 is present.

In the air pollution control system 10 a sulfur compound (in particular $SO_3$) contained in the flue gas is absorbed by the limestone by supplying the limestone to a flow path of the flue gas on an upstream of the heat recovery device 15 using the limestone supply device 100. In this way, even when a temperature of the flue gas is lowered by the heat recovery device 15, and $SO_3$ is at a temperature lower than or equal to an acid dew-point, $SO_3$ is transported in the flue gas together with the limestone and may be inhibited from adhering to the heat recovery device 15 or the gas supply lines $L_2$ and $L_3$. In this way, it is possible to suppress occurrence of corrosion inside a path of the air pollution control system 10. Further, it is possible to recover a larger amount of heat from the flue gas using the heat recovery device 15 while suppressing corrosion.

In addition, the supplied limestone becomes the limestone slurry 20 by the desulfurization device 16, and thus the supplied limestone may be efficiently used and inhibited from being discharged to an outside of a path. Herein, the controller 28 preferably adjusts the amount of the limestone supplied from the limestone supply device 100 and the amount of the limestone slurry 20 supplied from the limestone slurry supply device 21 based on a sulfur oxide concentration in the flue gas. In this way, it is possible to supply the limestone required into the gas supply line $L_2$ while supplying the limestone required in the desulfurization device 16 to the desulfurization device 16.

The limestone supply device 100 may include the moisture supply unit 110, and spray the vapor onto a region in which the limestone sprayed into the gas supply line $L_2$ from the nozzle 141 is present, thereby increasing the amount of the moisture in a range in which the limestone is present. In this way, it is possible to increase a moisture concentration in a portion around the limestone sprayed into the gas supply line $L_2$, and to achieve a state in which a sulfur compound (in particular $SO_3$) is easily adsorbed by the limestone in the flue gas. When a state in which $SO_3$ is easily adsorbed by the limestone is achieved, removal performance of removing $SO_3$ by the limestone may be improved. In addition, when the removal performance of the limestone is improved, it is possible to reduce the amount of the supplied limestone with respect to a sulfur oxide concentration of the flue gas. In this way, the limestone may be efficiently used.

In addition, when a sulfur concentration is high because of using crude oil, and the like as a fuel, and when $SO_3$ content of the flue gas is high, there is a possibility that the amount of the limestone supplied by the limestone supply device 100 may increase more than the amount of the limestone required in the desulfurization device 16. This may cause a state that the limestone is provided excessively in the absorbent 30, and a gypsum purity of the gypsum 31 may decrease. On the other hand, the limestone supply device 100 may efficiently use the limestone, and thus it is possible to suppress the amount of the limestone supplied by the limestone supply device 100 to a minimum required extent.

Herein, the limestone supply device 100 may improve the removal performance as illustrated in FIG. 4 by supplying the vapor using the moisture supply unit 110 and increasing the amount of moisture as much as possible with respect to the amount of the sprayed limestone around the nozzle 141. Referring to FIG. 4, a vertical axis depicts $SO_3$ removal performance, and a horizontal axis depicts the amount of the input moisture/the amount of supplied $CaCO_3$. As illustrated in FIG. 4, when a certain amount of the input moisture is exceeded, $SO_3$ removal performance hardly increases. In addition, when the amount of the moisture is increased, $SO_3$ gas is easily condensed, and a possibility that sulfate corrosion will occur in the heat exchanger (the heat recovery device 15, and the like) increases. Thus, it does not mean that the amount of the moisture is increased without restriction. As described above, the limestone supply device 100 is preferably used within a range in which effective improvement in $SO_3$ removal performance is expected with respect to the amount of the input moisture. That is, the moisture is preferably supplied at a ratio that satisfies the amount of the input moisture/the amount of supplied $CaCO_3$ for being able to maintain high $SO_3$ removal performance and suppress $SO_3$ gas from being easily condensed.

In addition, as in the present embodiment, when a position at which the moisture supply unit 110 supplies moisture is located around the nozzle 141, a moisture concentration around the limestone sprayed into the gas supply line $L_2$ may be efficiently increased. In this way, $SO_3$ removal performance by the limestone may be further increased with a smaller amount of the vapor.

Further, the moisture supply unit 110 preferably uses superheated vapor, that is, overheated vapor (for example, vapor having a higher temperature than 100 degrees at an atmospheric pressure) as the vapor. In this way, the vapor supplied by the moisture supply unit 110 may be inhibited from causing clogging of the limestone sprayed by the limestone transport unit 106 and the limestone supply unit 107.

Furthermore, a configuration of the limestone supply device is not restricted to the above-described configuration. For example, even though a portion of a supply path of the limestone is separated into two systems, one system or three or more systems may be employed. In addition, as in the embodiment, the moisture supply unit preferably supplies the moisture from around a nozzle that sprays the limestone. However, the invention is not limited thereto. For example, a moisture supply unit by a droplet spraying nozzle may be used.

Figure 5:
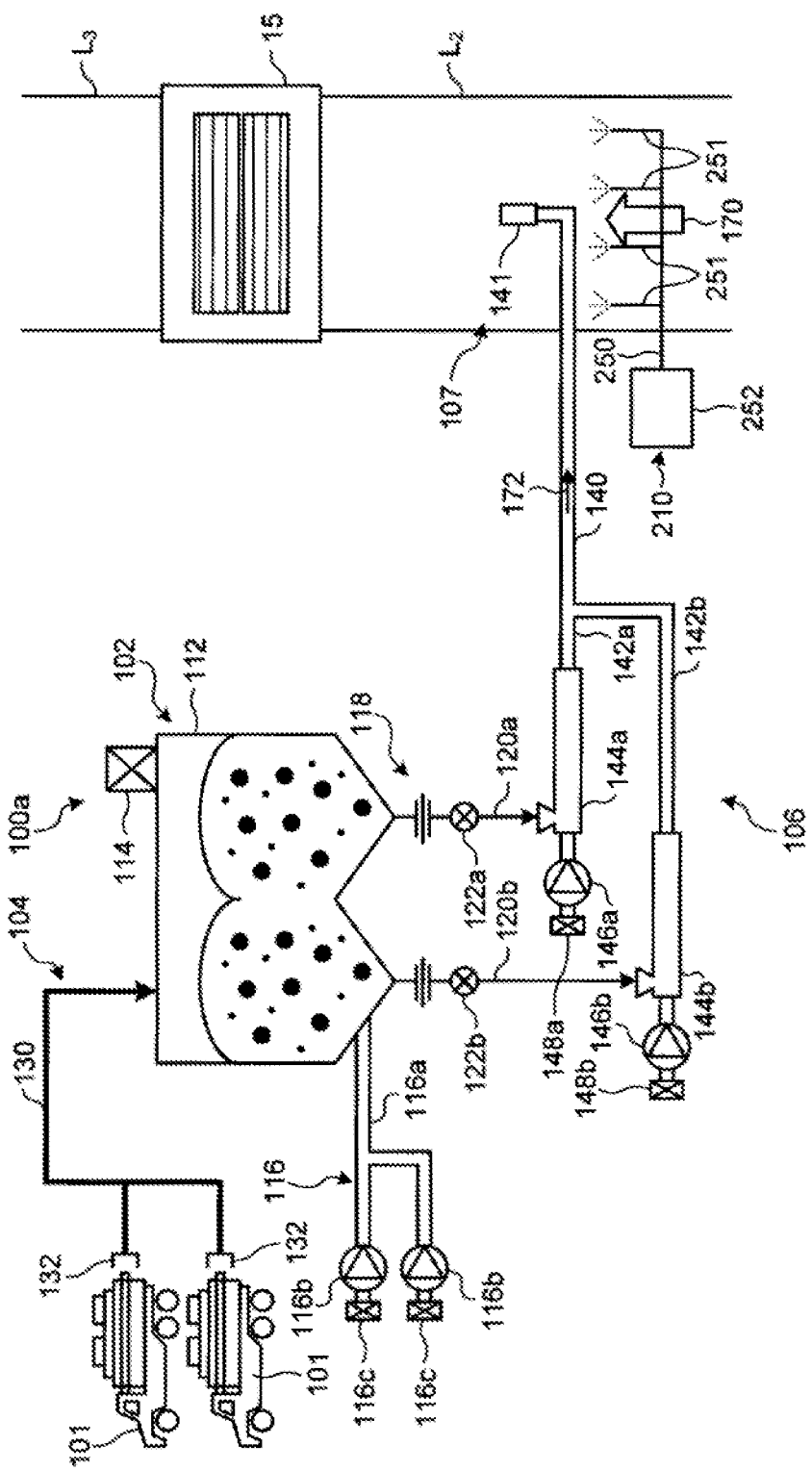
FIG. 5 is a schematic diagram illustrating another example of the limestone supply device.

FIG. 5 is a schematic diagram illustrating another example of a limestone supply device. A limestone supply device 100a illustrated in FIG. 5 has the same configuration as that of the limestone supply device 100 except for a moisture supply unit. The same reference numeral will be applied to the same component as that of the limestone supply device 100, and a description thereof will be omitted. A unique point of the limestone supply device 100a will be mainly described. As illustrated in FIG. 5, the limestone supply device 100a includes a limestone accumulate unit 102, a limestone input means 104, a limestone transport unit 106, a limestone supply unit 107, and a moisture supply unit 210.

The moisture supply unit 210 includes a vapor supply line 250, a vapor nozzle 251, and a vapor supply unit 252. The vapor supply line 250 is a pipe that guides vapor, and is disposed on an upstream side of a nozzle 141 in a flow direction of flue gas 170. The vapor supply line 250 extends from the outside to the inside of the gas supply line $L_2$. The vapor nozzle 251 is disposed at an end portion of the vapor supply line 250 inside the gas supply line $L_2$. The moisture supply unit 210 includes a plurality of vapor nozzles 251 at the end portion of the vapor supply line 250 inside the gas supply line $L_2$. The vapor nozzles 251 spray the vapor supplied from the vapor supply line 250 into the gas supply line $L_2$. The vapor nozzles 251 are disposed on an upstream side of the nozzle 141 in the flow direction of the flue gas 170, and spray the vapor at the upstream side of the nozzle 141. The vapor supply unit 252 is connected to an end portion of the vapor supply line 250 outside the gas supply line $L_2$.

The limestone supply device 100a and the moisture supply unit 210 have the above-described configurations, and may increase the amount of moisture included in the flue gas passing through the nozzle 141 by spraying the vapor at the upstream side of the nozzle 141. In this way, even when the moisture is supplied from a portion not around the nozzle 141 from which the limestone is sprayed, $SO_3$ removal performance by the limestone may be improved by increasing the amount of the moisture of the flue gas passing through the nozzle 141. As illustrated in FIG. 4, when a certain amount of the input moisture is exceeded, $SO_3$ removal performance hardly increases. In addition, when the amount of the moisture is increased, $SO_3$ gas is easily condensed, and a possibility that sulfate corrosion will occur in the heat exchanger (the heat recovery device 15, and the like) increases. Thus, it does not mean that the amount of the moisture is increased without restriction. As described above, the limestone supply device 100a is preferably used within a range in which effective improvement in $SO_3$ removal performance is expected with respect to the amount of the input moisture. That is, the moisture is preferably supplied at a ratio that satisfies the amount of the input moisture/the amount of supplied $CaCO_3$ for being able maintain high $SO_3$ removal performance and suppress $SO_3$ gas from being easily condensed. In addition, further effective improvement in $SO_3$ removal performance may be expected by adjusting vapor spraying and limestone spraying such that a place in which the amount of the moisture in the gas is locally increased by spraying the vapor is identical to a place filled with the sprayed limestone.

In addition, while the vapor is supplied as the moisture in the above embodiment, liquid water may be supplied. When the liquid water is supplied, the water is preferably sprayed at a position at which the water is in an evaporated state by the heat of the flue gas at the time of passing through the nozzle 141.

Figure 6:
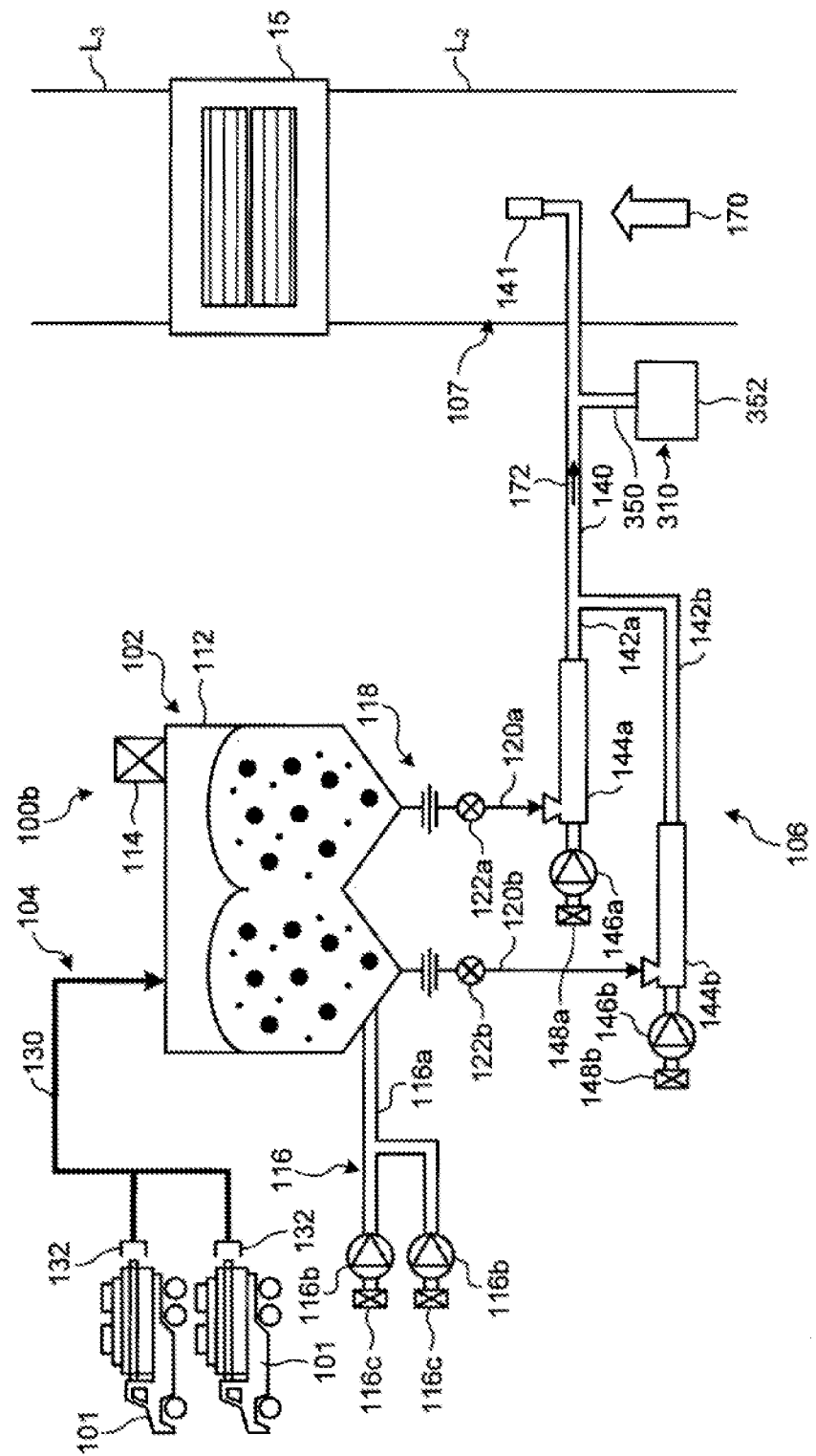
FIG. 6 is a schematic diagram illustrating another example of the limestone supply device.

FIG. 6 is a schematic diagram illustrating another example of the limestone supply device. A limestone supply device 100b illustrated in FIG. 6 has the same configuration as that of the limestone supply device 100 except, for a moisture supply unit. The same reference numeral will be applied to the same component as that of the limestone supply device 100, and a description thereof will be omitted. A unique point of the limestone supply device 100b will be mainly described. As illustrated in FIG. 6, the limestone supply device 100b includes a limestone accumulate unit 102, a limestone input means 104, a limestone transport unit 106, a limestone supply unit 107, and a moisture supply unit 310.

The moisture supply unit 310 includes a vapor supply line 350 and a vapor supply portion 352. The vapor supply line 350 is a pipe that guides vapor, and is connected to a limestone supply line 140. The vapor supply portion 352 is connected to the vapor supply line 350.

The limestone supply device 100b and the moisture supply unit 310 have the above-described configurations, and the moisture supply unit 310 supplies the vapor into the limestone supply line 140 in which the limestone flows. In this way, the vapor together with the limestone is sprayed from a nozzle 141 of the limestone supply device 100b. As described above, even when the vapor together with the limestone is sprayed from the nozzle 141, it is possible to increase the amount of the moisture in a range in which the limestone sprayed from the nozzle 141 is present, and to improve $SO_3$ removal performance by the limestone.

The limestone supply device 100b and the moisture supply unit 310 may suppress clogging of the limestone inside the limestone supply line 140 by using the vapor, more preferably, overheated vapor as the moisture.

In the air pollution control system 10 of the present embodiment, the limestone supply device 100 supplies the limestone between the dust collector 14 and the heat recovery device 15. However, a position to which the limestone supply device 100 supplies the limestone is not restricted thereto. The limestone supply device 100 may be connected to a flue gas duct on an upstream side of the desulfurization device 16 and on an upstream side of any one of the heat exchangers in the flow direction of the flue gas 18 to supply the limestone. The air pollution control system 10 of the present embodiment may connect the limestone supply device 100 between the denitration device 12 and the air heater 13 on the gas supply line $L_1$, and supply the limestone of an upstream side of the air heater 13 using the limestone supply device 100. The limestone supply device 100 may be connected to the flue gas duct on the upstream side of the desulfurization device 16 and on the upstream side of any one of the heat exchangers to supply the limestone, thereby supplying the limestone of an upstream side of the heat exchanger and preferably suppressing corrosion of a heat transfer pipe of the heat exchanger.

In addition, in the air pollution control system 10, the dust collector 14 is provided on the gas supply line $L_1$ which is on an upstream side of a portion connected to the limestone supply device 100 on the gas supply line $L_2$. However, the dust collector 14 may not be provided. In addition, when the limestone supply device 100 supplies the limestone between the denitration device 12 and the air heater 13 without the dust collector 14, inhibiting the limestone supplied from the limestone supply device 100 from being collected by the dust collector 14 and inhibiting the limestone supplied to the desulfurization device 16 from being reduced can be achieved. Thus, the air pollution control system 10 may preferably adjust the amount of the limestone supplied to the desulfurization device 16.

REFERENCE SIGNS LIST

10 AIR POLLUTION CONTROL SYSTEM
11 BOILER
12 DENITRATION DEVICE
13 AIR HEATER
14 DUST COLLECTOR
15 HEAT RECOVERY DEVICE
16 DESULFURIZATION DEVICE
18 FLUE GAS
20 LIMESTONE SLURRY
21 LIMESTONE SLURRY SUPPLY DEVICE
22 COLUMN BOTTOM PORTION
23 NOZZLE
24 COLUMN TOP PORTION
26 REHEATER
27 STACK
28 CONTROLLER
100 LIMESTONE SUPPLY DEVICE
101 TRANSPORT VEHICLE
102 LIMESTONE ACCUMULATE UNIT
104 LIMESTONE INPUT MEANS
106 LIMESTONE TRANSPORT UNIT
107 LIMESTONE SUPPLY UNIT
110, 210, 310 MOISTURE SUPPLY UNIT
112 SILO
114 BAG FILTER
116 AERATION MECHANISM
116a AIR SUPPLY LINE
116b BLOWER
116c, 148a, 148b FILTER
118 LIMESTONE FEEDER
120a, 120b FEEDER LINE
122a, 122b VALVE
130 INPUT LINE
132 INPUT PORT
140 LIMESTONE SUPPLY LINE
141 NOZZLE
142a, 142b BRANCH LINE
144a, 144b MIXING UNIT
146a, 146b BLOWER
150 VAPOR SUPPLY LINE
151 VAPOR NOZZLE
152 VAPOR SUPPLY UNIT
170 FLUE GAS
172 LIMESTONE
174 VAPOR
F FUEL
$L_1$, $L_2$, $L_3$ GAS SUPPLY LINE

The invention claimed is:

1. An air pollution control system comprising:
a dust collector configured to remove dust in flue gas from a combustion engine in which fuel burns;
a heat exchanger configured to recover heat of the flue gas passing the dust collector;
a desulfurization device configured to remove sulfur oxides contained in the flue gas using an absorbent after removing the dust;
a limestone supply device arranged between the dust collector and the desulfurization device or an upstream of the dust collector; and
a controller, wherein the limestone supply device comprising;
a calcium carbonate accumulate unit configured to accumulate calcium carbonate;
a calcium carbonate transport unit configured to transport the calcium carbonate accumulated in the calcium carbonate accumulate unit;
a calcium carbonate supply unit configured to supply the calcium carbonate transported by the calcium carbonate transport unit to a flue gas duct; and
a moisture supply unit configured to supply moisture to a region of the flue gas duct to which the calcium carbonate is supplied by the calcium carbonate supply unit;
wherein the controller is configured to adjust an amount of the calcium carbonate supplied from the calcium carbonate supply unit and an amount of the calcium carbonate in the absorbent supplied to the desulfurization device based on a sulfur oxide concentration in the flue gas.

2. The air pollution control system according to claim 1, wherein the moisture supply unit is disposed around an end portion of the calcium carbonate supply unit at which the calcium carbonate is supplied to form double pipes with the end portion of the calcium carbonate supply unit, and the moisture supply unit supplies the moisture from an outer circumference of the end portion.

3. The air pollution control system according to claim 1, wherein the moisture supply unit supplies the moisture to the flue gas duct on an upstream side of a position at which the calcium carbonate supply unit supplies the calcium carbonate in a flow direction of the flue gas.

4. The air pollution control system according to claim 1, wherein the moisture is vapor.

5. The air pollution control system according to claim 3, wherein the moisture is a liquid.

6. An air pollution control system according to claim 1, wherein the moisture is superheated vapor.

7. The air pollution control system according to claim 1, wherein the combustion engine is a boiler.

* * * * *